US012260837B2

(12) United States Patent
Hayashi

(10) Patent No.: US 12,260,837 B2
(45) Date of Patent: Mar. 25, 2025

(54) DISPLAY DEVICE

(71) Applicant: Japan Display Inc., Tokyo (JP)

(72) Inventor: Hirotaka Hayashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/413,507

(22) Filed: Jan. 16, 2024

(65) Prior Publication Data

US 2024/0257780 A1 Aug. 1, 2024

(30) Foreign Application Priority Data

Jan. 27, 2023 (JP) ................................ 2023-011202

(51) Int. Cl.
*G09G 3/36* (2006.01)

(52) U.S. Cl.
CPC ......... *G09G 3/3655* (2013.01); *G09G 3/3614* (2013.01); *G09G 2310/0235* (2013.01); *G09G 2310/08* (2013.01); *G09G 2320/0252* (2013.01)

(58) Field of Classification Search
None
See application file for complete search history.

(56) References Cited

U.S. PATENT DOCUMENTS 5,691,783 A * 11/1997 Numao ................ G09G 3/3651 349/158
2002/0000962 A1* 1/2002 Miura .................. G09G 3/3651 345/87
2005/0007331 A1* 1/2005 Yamazaki ............ G09G 3/2011 345/92
2006/0125715 A1* 6/2006 Choi .................... G09G 3/3655 345/14
2008/0084370 A1* 4/2008 Wang ................... G09G 3/3648 345/87
2008/0239180 A1* 10/2008 Sekine ................. G09G 3/3611 349/37
2012/0327137 A1* 12/2012 Saitoh ................. G09G 3/3648 345/690
2014/0267449 A1* 9/2014 Hong ................... G09G 3/3696 345/89
2018/0268773 A1* 9/2018 Imai ..................... G09G 3/3696
2019/0130860 A1* 5/2019 Ozaki .................. G09G 3/3677
2022/0108665 A1* 4/2022 Ozaki .................. G09G 3/3413

FOREIGN PATENT DOCUMENTS

JP 2019078979 A 5/2019

* cited by examiner

*Primary Examiner* — Dorothy Harris
(74) *Attorney, Agent, or Firm* — K&L Gates LLP

(57) ABSTRACT

According to an aspect, a display device includes scan lines, signal lines, a scan circuit, a signal output circuit, pixels each having a switching element and a pixel electrode, a common electrode, and a common electrode drive circuit. In a potential reset period to reset a potential of the pixel electrode and a common potential inversion period subsequent to the potential reset period, the scan circuit supplies, to the scan lines, a drive potential to drive the switching elements, and the signal output circuit supplies, to the signal lines, an intermediate potential between a potential corresponding to a maximum gradation value and a potential corresponding to a minimum gradation value. In the common potential inversion period, the common electrode drive circuit switches the common potential between a first common potential and a second common potential higher than the first common potential.

3 Claims, 10 Drawing Sheets

--Prior Art--

--Prior Art--

--Prior Art--

DISPLAY DEVICE

CROSS-REFERENCE TO RELATED APPLICATION

This application claims the benefit of priority from Japanese Patent Application No. 2023-011202 filed on Jan. 27, 2023, the entire contents of which are incorporated herein by reference.

BACKGROUND

1. Technical Field

What is disclosed herein relates to a display device.

2. Description of the Related Art

Liquid crystal display devices are known that perform display output using what is called a field-sequential color system to control pixels such that light in a plurality of colors is transmitted through the same pixel at times different from one another.

In general, a liquid crystal display device performs inversion drive to invert the direction of a voltage applied to liquid crystals at predetermined time intervals. At this time, a reset potential is applied to all pixels to discharge potential stored in pixel capacitors. This operation can prevent a withstand voltage of pixel transistors from being exceeded due to capacitive coupling of the pixel capacitor when a common potential is inverted. However, in order to ensure a margin for writing the maximum gradation value to the pixels in a sub-frame period after the reset, a write period needs to be set longer.

For the foregoing reasons, there is a need for a display device capable of reducing a pixel write period.

SUMMARY

According to an aspect, a display device includes: a plurality of scan lines that extend in a first direction; a plurality of signal lines that extend in a direction intersecting the first direction; a scan circuit coupled to the scan lines; a signal output circuit coupled to the signal lines; a plurality of pixels, in each of which a gate of a switching element is coupled to a corresponding scan line of the scan lines, a pixel electrode is coupled to one of a source and a drain of the switching element, and a corresponding signal line of the signal lines is coupled to the other of the source and the drain of the switching element; a common electrode shared among the pixels; and a common electrode drive circuit configured to supply a common potential to the common electrode. In a potential reset period to reset a potential of the pixel electrode, and in a common potential inversion period subsequent to the potential reset period, the scan circuit is configured to supply, to the scan lines, a drive potential to drive the switching elements, and the signal output circuit is configured to supply, to the signal lines, an intermediate potential between a potential corresponding to a maximum gradation value of each pixel and a potential corresponding to a minimum gradation value of each pixel. In the common potential inversion period, the common electrode drive circuit is configured to switch the common potential between a first common potential and a second common potential higher than the first common potential.

According to an aspect, a display device includes: a plurality of scan lines that extend in a first direction; a plurality of signal lines that extend in a direction intersecting the first direction; a scan circuit coupled to the scan lines; a signal output circuit coupled to the signal lines; a plurality of pixels, in each of which a gate of a switching element is coupled to a corresponding scan line of the scan lines, a pixel electrode is coupled to one of a source and a drain of the switching element, and a corresponding signal line of the signal lines is coupled to the other of the source and the drain of the switching element; a common electrode shared among the pixels; and a common electrode drive circuit configured to supply a common potential to the common electrode. In a potential reset period to reset a potential of the pixel electrode, the scan circuit is configured to supply, to the scan lines, a drive potential to drive the switching elements. In a common potential inversion period subsequent to the potential reset period, the common electrode drive circuit is configured to switch the common potential between a first common potential and a second common potential higher than the first common potential. In a precharge period after the common potential is switched, the signal output circuit is configured to supply, to the signal lines, an intermediate potential between a potential corresponding to a maximum gradation value of each pixel and a potential corresponding to a minimum gradation value of each pixel, and the scan circuit is configured to supply the drive potential to the scan lines.

DETAILED DESCRIPTION

Figure 1:
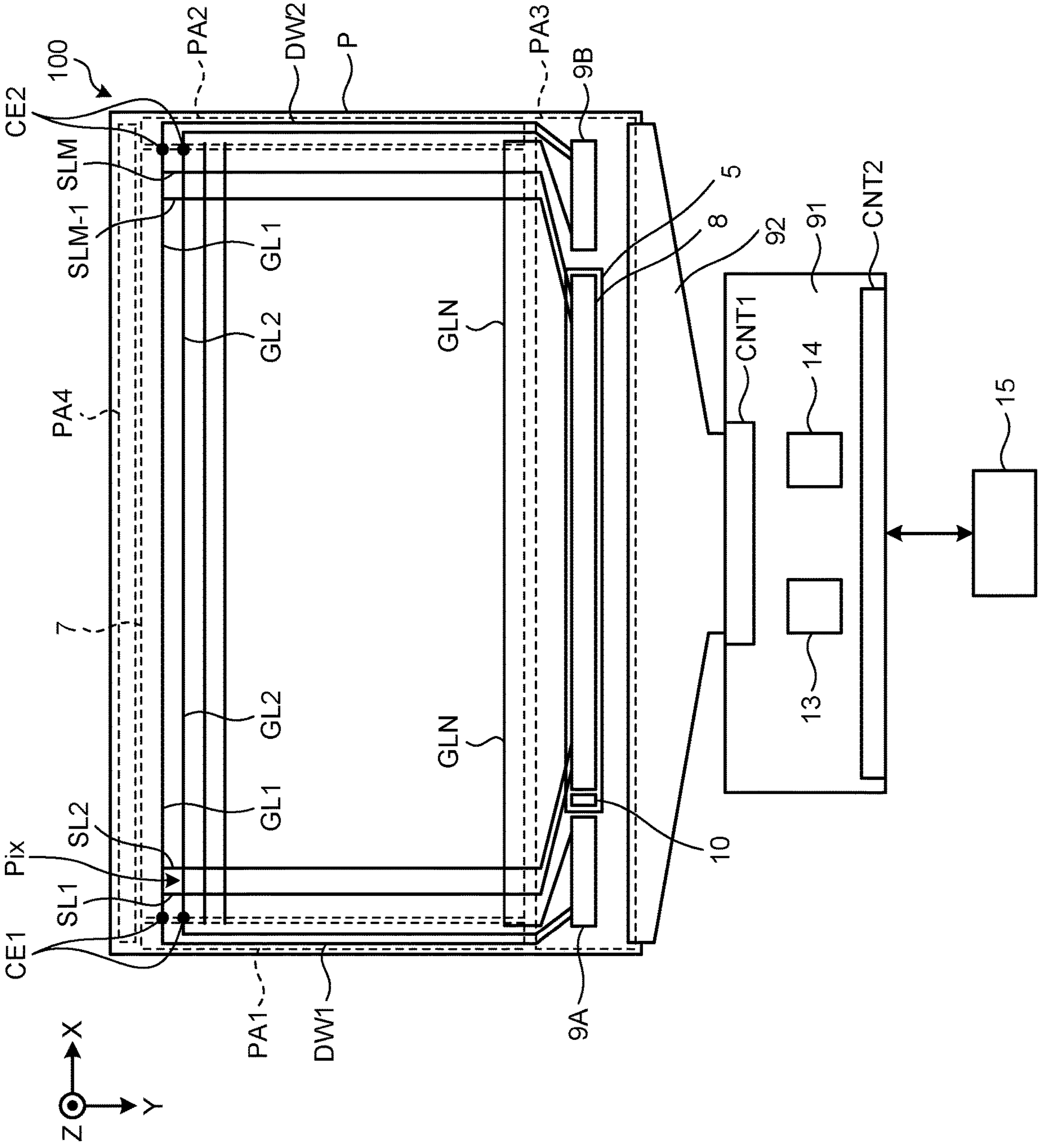
FIG. 1 is a plan view illustrating an exemplary display device according to a present embodiment.

The following describes embodiments of the present disclosure with reference to the drawings. What is disclosed herein is merely an example, and the present disclosure naturally encompasses appropriate modifications easily conceivable by those skilled in the art while maintaining the gist of the invention. To further clarify the description, the drawings schematically illustrate, for example, widths, thicknesses, and shapes of various parts as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

Figure 2:
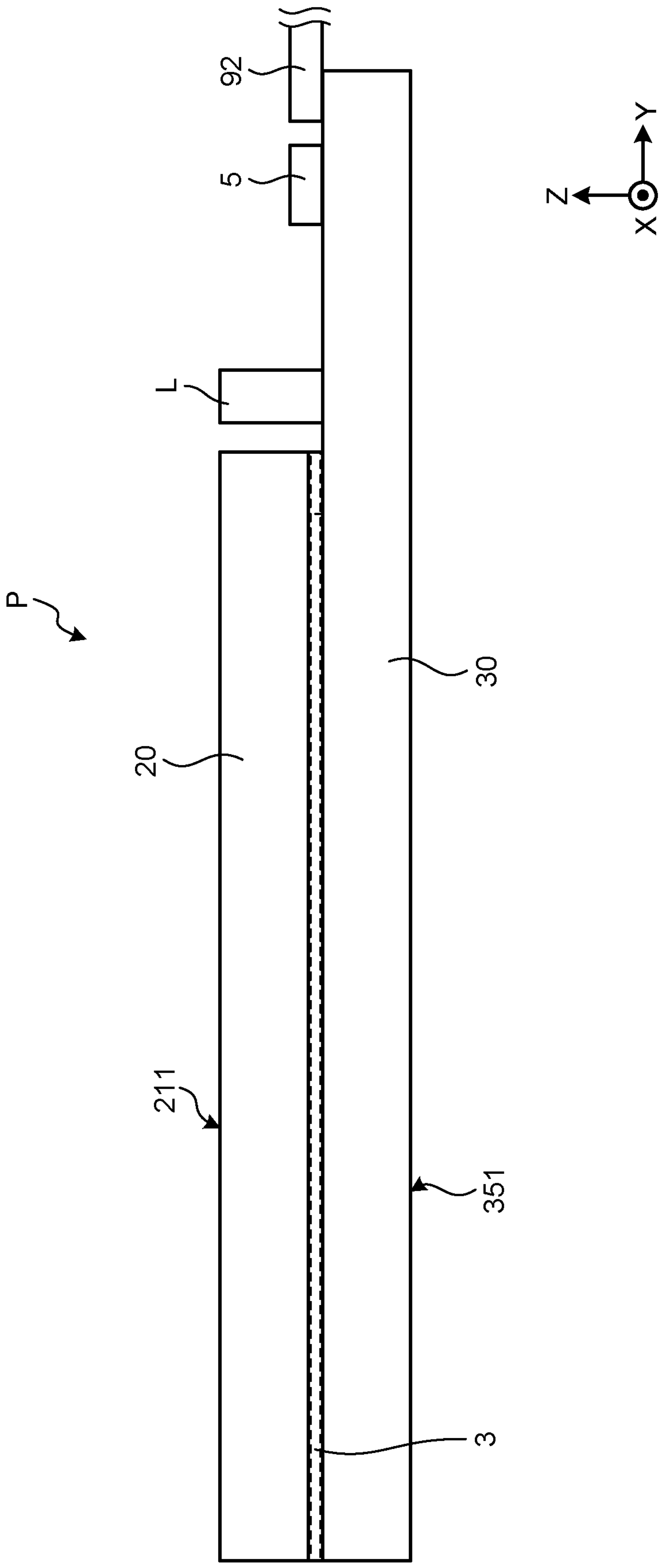
FIG. 2 is a sectional view illustrating an exemplary section of the display device of FIG. 1.
Figure 3:
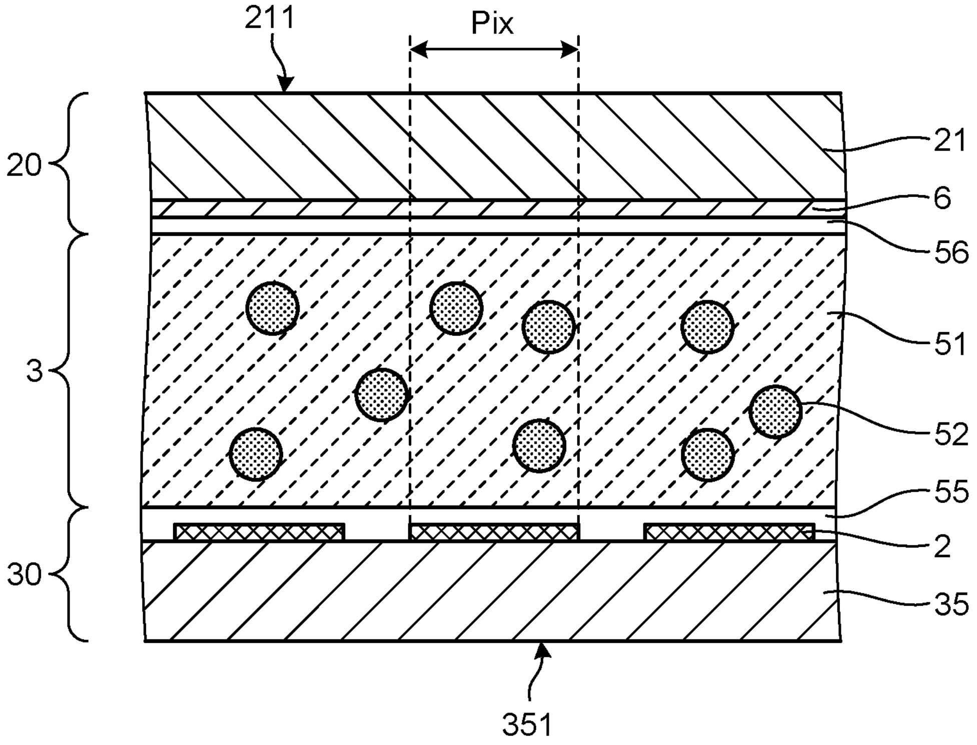
FIG. 3 is a partial sectional view obtained by enlarging a portion of FIG. 2.
Figure 4:
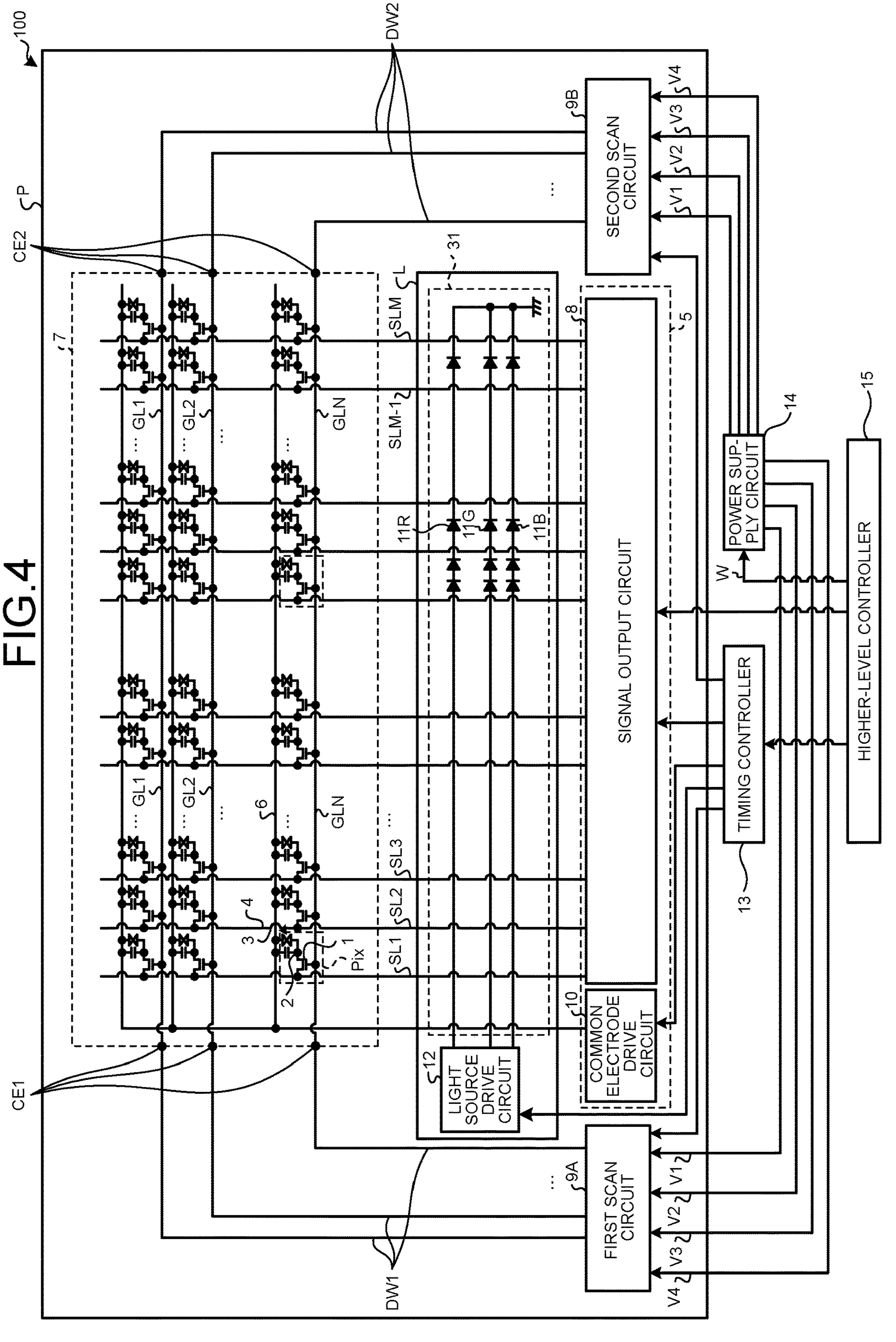
FIG. 4 is a schematic circuit diagram illustrating a main configuration of the display device of the present embodiment.

FIG. 1 is a plan view illustrating an exemplary display device according to a present embodiment. FIG. 1 does not illustrate a light source device L illustrated in FIG. 2. FIG. 2 is a sectional view illustrating an exemplary section of the display device of FIG. 1. FIG. 3 is a partial sectional view obtained by enlarging a portion of FIG. 2. FIG. 4 is a schematic circuit diagram illustrating a main configuration of the display device of the present embodiment.

As illustrated in FIG. 1, a display device 100 includes a display panel P, a circuit substrate 91, and a flexible substrate 92 that couples the display panel P to the circuit substrate 91. A first direction X denotes one direction in a plane of the display panel P. A second direction Y denotes a direction orthogonal to the first direction X. A third direction Z denotes a direction orthogonal to the X-Y plane.

The display panel P has a display region 7, and a first peripheral region PA1, a second peripheral region PA2, a third peripheral region PA3, and a fourth peripheral region PA4 provided around the display region 7. The first peripheral region PA1 and the second peripheral region PA2 interpose the display region 7 therebetween in the first direction X. The third peripheral region PA3 and the fourth peripheral region PA4 interpose the display region 7 therebetween in the second direction Y.

A driver integrated circuit (IC) 5, a first scan circuit 9A, and a second scan circuit 9B are arranged in the third peripheral region PA3. The driver IC 5 includes a signal output circuit 8 and a common electrode drive circuit 10.

In the first peripheral region PA1, a plurality of first lead lines DW1 are provided outside first coupling ends CE1 of respective scan lines GL in the first direction X. The first scan circuit 9A is electrically coupled to the first coupling ends CE1 through the respective first lead lines DW1. In the second peripheral region PA2, a plurality of second lead lines DW2 are provided outside second coupling ends CE2 of the respective scan lines GL in the first direction X. The second scan circuit 9B is electrically coupled to the second coupling ends CE2 through the respective second lead lines DW2. The first lead lines DW1 and the second lead lines DW2 are arranged line-symmetrically to each other with respect to the center line in the second direction Y passing through the center in the first direction X of the display region 7.

In the display region 7, a plurality of scan lines GL1, GL2, . . . , GLN (where N is an integer equal to or larger than 1) extending in the first direction X are arranged with gaps interposed therebetween in the second direction Y. Hereafter, the scan lines GL1, GL2, . . . , GLN may be collectively referred to as scan lines GLn (where n is an integer from 1 to N). In the display region 7, a plurality of signal lines SL1, SL2, . . . , SLM−1, SLM (where M is an integer equal to or larger than 1) extending in the second direction are arranged with gaps interposed therebetween in the first direction X. Hereafter, the signal lines SL1, SL2, . . . , SLM−1, SLM may be collectively referred to as signal lines SLm (where m is an integer from 1 to M).

A plurality of pixels Pix are arranged in a matrix in a row-column configuration in the display region 7. In the present disclosure, a row refers to a pixel row including M pixels Pix arranged in one direction. A column refers to a pixel column including N pixels Pix arranged in a direction orthogonal to the direction in which the rows extend. The values of M and N are determined according to a display resolution in the vertical direction and a display resolution in the horizontal direction. The scan lines GLn are provided corresponding to the rows, and the signal lines SLm are provided corresponding to the columns.

A timing controller 13 and a power supply circuit 14 are arranged on the circuit substrate 91.

The display panel P includes a first substrate 30, a second substrate 20, a liquid crystal layer 3, and the light source device L. The second substrate 20 faces a surface of the first substrate 30 in a direction orthogonal thereto (in the third direction Z illustrated in FIG. 1). As the liquid crystal layer 3, polymer-dispersed liquid crystals LC are sealed between the first substrate 30 and the second substrate 20.

The display panel P of the present embodiment is a display panel where, for example, when a display surface is denoted as a first surface 351 of the first substrate 30, a back surface is denoted as a second surface 211 of the second substrate 20. A background on the back surface can be seen through when viewed from the display surface side, and a background on the display surface can be seen through when viewed from the back surface side. The display surface may be the second surface 211 and the back surface may be the first surface 351.

As illustrated in FIG. 2, the light source device L is a sidelight located on a side surface side orthogonal to the first surface 351 of the first substrate 30 and second surface 211 of the second substrate 20. The plane of light incidence is not limited to the side surface of the first substrate 30, but the light source device L may emit light toward the side surface of the second substrate 20, or toward the side surface of the first substrate 30 and the side surface of the second substrate 20.

As illustrated in FIG. 3, the first substrate 30 includes a light-transmitting glass substrate 35, pixel electrodes 2 formed on the second substrate 20 side of the glass substrate 35, and a first orientation film 55 stacked on the second substrate 20 side of each pixel electrode 2 so as to cover the pixel electrodes 2. The pixel electrode 2 is individually provided for each of the pixels Pix. The second substrate 20 includes a light-transmitting glass substrate 21, a common electrode 6 formed on the first substrate 30 side of the glass substrate 21, and a second orientation film 56 stacked on the first substrate 30 side of the common electrode 6 so as to cover the common electrode 6. The common electrode 6 has a plate-like or film-like shape shared among the pixels Pix. In the first substrate 30, although not illustrated in FIG. 3, each switching element 1 coupled to a corresponding one of the pixel electrodes 2 is formed between the pixel electrode 2 and the glass substrate 35. The first substrate 30 and the second substrate 20 may further include protective members formed of, for example, glass, on the display surface side (first surface 351 side and second surface 211 side) of the glass substrates 35 and 21. The protective members may be made of a resin, as long as transmitting light.

The liquid crystal layer 3 of the present embodiment is the polymer-dispersed liquid crystals. Specifically, the polymer-dispersed liquid crystals contain a bulk 51 and fine particles 52. A solution containing the liquid crystals and a monomer is filled between the first substrate 30 and the second substrate 20. In a state where the monomer and the liquid crystals are oriented by the first and the second orientation films 55 and 56, the monomer is polymerized by ultraviolet rays or heat to form the bulk 51. This process forms the liquid crystal layer 3 containing the polymer-dispersed liquid crystals in a reverse mode in which the liquid crystals are dispersed in gaps of a polymer network formed in a mesh shape.

Thus, the polymer-dispersed liquid crystals contain the bulk 51 formed of the polymer and the fine particles 52 dispersed in the bulk 51. The fine particles 52 are formed of the liquid crystals. Both the bulk 51 and the fine particles 52 are optically anisotropic.

The orientation of the liquid crystals contained in the fine particles 52 is controlled by a voltage difference between the pixel electrode 2 and the common electrode 6. The orientation of the liquid crystals is changed by the voltage applied to the pixel electrode 2. The degree of scattering of light passing through the pixels Pix changes with change in the orientation of the liquid crystals.

Ordinary-ray refractive indices of the bulk 51 and the fine particles 52 are equal to each other. When no voltage is applied between the pixel electrode 2 and the common electrode 6, the difference of refractive index between the bulk 51 and the fine particles 52 is zero in all directions. The liquid crystal layer 3 is placed in a non-scattering state of not scattering the light of the light source device L. Light in the display panel P propagates in a direction away from the light source device L (light emitter 31) while being reflected by the first surface 351 of the first substrate 30 and the second surface 211 of the second substrate 20. When the liquid crystal layer 3 is in the non-scattering state of not scattering the light, a background on the second surface 211 side of the second substrate 20 is visible from the first surface 351 of the first substrate 30, and a background on the first surface 351 side of the first substrate 30 is visible from the second surface 211 of the second substrate 20.

In the gap between the pixel electrode 2 and the common electrode 6 having a voltage applied thereto, an optical axis of the fine particles 52 is inclined by an electric field generated between the pixel electrode 2 and the common electrode 6. Since an optical axis of the bulk 51 is not changed by the electric field, the direction of the optical axis of the bulk 51 differs from that of the optical axis of the fine particles 52. The light is scattered in the pixel Pix including the pixel electrode 2 having a voltage applied thereto. A viewer views a part of the light that has been scattered as described above and emitted outward from the first surface 351 of the first substrate 30 or the second surface 211 of the second substrate 20.

With the pixel Pix including the pixel electrode 2 having no voltage applied thereto, the background on the second surface 211 side of the second substrate 20 is visible from the first surface 351 of the first substrate 30, and the background on the first surface 351 side of the first substrate 30 is visible from the second surface 211 of the second substrate 20. In the display device 100 of the present embodiment, a voltage is applied to the pixel electrode 2 of the pixel Pix to display an image, and the image is visible together with the background. Thus, the image is displayed in the display region 7 when the polymer-dispersed liquid crystals are in the scattering state.

The image displayed by the light that has been scattered in the pixel Pix including the pixel electrode 2 having a voltage applied thereto and has been emitted outward, is displayed so as to be superimposed on the background. In other words, the display device 100 of the present embodiment displays the image such that the image is superimposed on the background.

As illustrated in FIG. 4, the light source device L includes a light source drive circuit 12 and the light emitter 31 that includes pluralities of first, second, and third light sources 11R, 11G, and 11B. FIG. 4 illustrates some of the first, the second, and the third light sources 11R, 11G, and 11B as representatives. As illustrated in FIG. 4, the light source drive circuit 12 is mounted on the light source device L. The light source drive circuit 12 may be built into the driver IC separately from the light source device L.

Each of the first light sources 11R emits red light. Each of the second light sources 11G emits green light. Each of the third light sources 11B emits blue light. Each of the first, the second, and the third light sources 11R, 11G, and 11B emits the light under the control of the light source drive circuit 12. Each of the first, the second, and the third light sources 11R, 11G, and 11B of the present embodiment is a light source using, for example, a light-emitting element such as a light-emitting diode (LED), but is not limited thereto, and only needs to be a light source controllable in light emission timing. The light source drive circuit 12 controls the light emission timing of the first, the second, and the third light sources 11R, 11G, and 11B under the control of the timing controller 13.

As illustrated in FIG. 4, the timing controller 13 receives input signals (such as red-green-blue (RGB) signals) from an image output circuit of an external higher-level controller 15 through a flexible substrate, for example.

In the display region 7, the pixels Pix are arranged in a matrix in a row-column configuration, being arranged in the row and column directions. Each of the pixels Pix includes the switching element 1.

As illustrated in FIG. 4, the switching element 1 is a switching element using, for example, a semiconductor, such as a thin-film transistor (TFT). One of the source and the drain of the switching element 1 is coupled to one of the two electrodes (pixel electrode 2). The other of the source and the drain of the switching element 1 is coupled to a corresponding one of the signal lines SLm. The gate of the switching element 1 is coupled to a corresponding one of the scan lines GLn. The scan line GLn applies a potential (hereinafter also called "drive potential") for opening or closing a circuit between the source and the drain of the switching element 1 under the control of the first and the second scan circuits 9A and 9B. The first and the second scan circuits 9A and 9B control the drive potential.

As illustrated in FIG. 4, the signal lines SLm are arranged along one of the arrangement directions (row direction) of the pixels Pix. The signal lines SLm extend along the other of the arrangement directions (column direction) of the pixels Pix. Each of the signal lines SLm is shared by the switching elements 1 of the corresponding pixels Pix arranged in the column direction. The scan lines GLn are arranged along the column direction. The scan lines GLn extend along the row direction. Each of the scan lines GLn is shared by the switching elements 1 of the corresponding M pixels Pix arranged in the row direction.

The common electrode 6 is coupled to the common electrode drive circuit 10. The common electrode drive circuit 10 applies a common potential to the common electrode 6. When the first and the second scan circuits 9A and 9B apply drive potentials VGn (VG1, VG2, . . . , VGN (refer to FIG. 6)) to the scan lines GLn, the signal output circuit 8 outputs a pixel signal Sigm (refer to FIG. 6) to each of the signal lines SLm to charge a storage capacitor formed between each pixel electrode 2 and the common electrode 6 and the liquid crystals (fine particles 52) serving as a capacitive load. This operation sets the potential of the pixel electrode 2 of the pixel Pix to a potential corresponding to the pixel signal Sigm. After the completion of the application of the drive potentials VGn, the storage capacitor and the liquid crystals (fine particles 52) serving as the capacitive load hold the potential of the pixel electrode 2 of the Pixel Pix corresponding to the pixel signal Sigm. The orientation of the liquid crystals (fine particles 52) is controlled according to an electric field generated by a difference voltage between the potential of the pixel electrode 2 of each of the pixels Pix and a common potential Vcom (first common potential VcomL or second common potential VcomH (refer to FIGS. 5 and 6)) of the common electrode 6 applied by the common electrode drive circuit 10.

The timing controller 13 controls the operation timing of the signal output circuit 8, the first and the second scan circuits 9A and 9B, the common electrode drive circuit 10, and the light source drive circuit 12. In the present embodiment, the operation control is performed using a field-sequential color (FSC) method.

Figure 5:
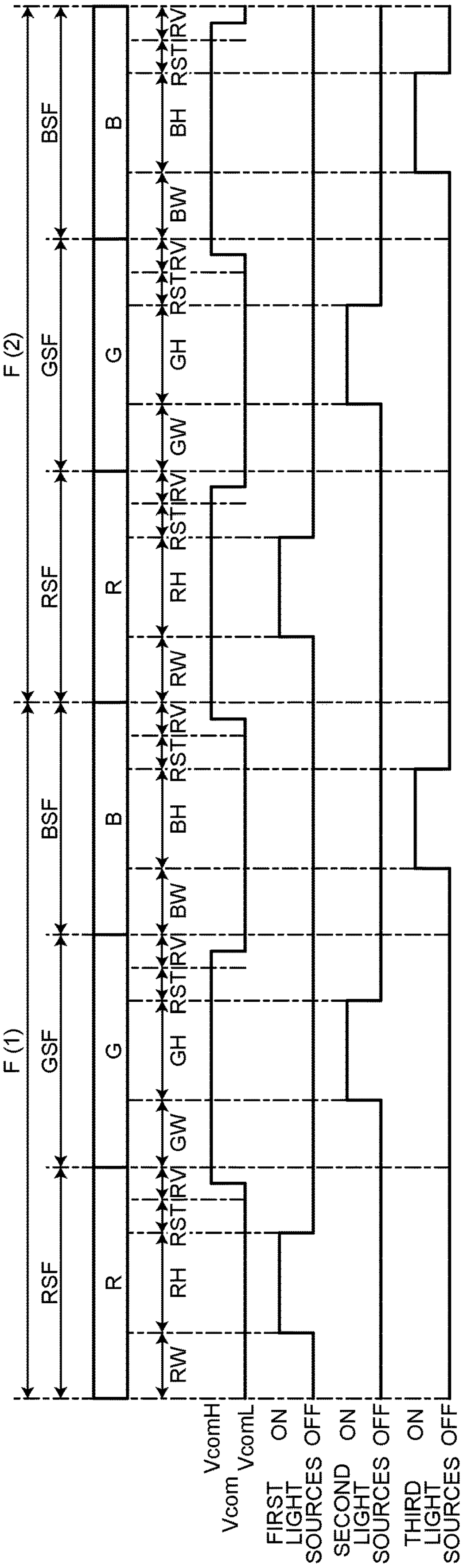
FIG. 5 is a timing diagram illustrating an exemplary process of field-sequential color (FSC) control of the present embodiment.

FIG. 5 is a timing diagram illustrating an exemplary process of the FSC control of the present embodiment. FIG. 5 illustrates a schematic timing diagram of two consecutive frame periods F(1) and F(2). The two frame periods F(1) and F(2) illustrated in FIG. 5 are periodically repeated to perform the operation control using the FSC method according to the present embodiment. That is, in the present embodiment, the two frame periods F(1) and F (2) illustrated in FIG. 5 are alternately repeated. FIG. 5 also illustrates the inversion timing of the common potential Vcom applied to the common electrode 6 by the common electrode drive circuit 10 and the lighting timing of each of the light sources (first, second, and third light sources 11R, 11G, and 11B) of the light emitter 31.

In the FSC control of the present embodiment, each of the frame periods F(1) and F(2) includes a plurality of sub-frame periods. In other words, each of the frame periods F(1) and F(2) is temporally divided into a plurality of sub-frame periods. Specifically, in the example illustrated in FIG. 5, each of the frame periods F(1) and F(2) is temporally divided into a first sub-frame period RSF, a second sub-frame period GSF, and a third sub-frame period BSF. The number of the sub-frame periods included in each of the frame periods F(1) and F (2) corresponds to the number of colors of the light sources of the light emitter 31. The number and types of colors of the light sources of the light emitter 31 and the number of the sub-frame periods included in each of the frame periods F(1) and F(2) in the present embodiment are merely exemplary, and are not limited to those cited above, but can be changed as appropriate.

In the FSC control of the present embodiment, the common electrode drive circuit 10 performs inversion drive to switch the common potential Vcom applied to the common electrode 6 for each of the sub-frame periods (first sub-frame period RSF, second sub-frame period GSF, and third sub-frame period BSF). Specifically, the common electrode drive circuit 10 switches the common potential Vcom between the first common potential VcomL, which is relatively low, and the second common potential VcomH, which is relatively high, for each of the sub-frame periods.

The sub-frame periods (first sub-frame period RSF, second sub-frame period GSF, and third sub-frame period BSF) include write periods RW, GW, and BW for writing the pixel signal Sigm and hold periods RH, GH, and BH for holding the pixel signal Sigm by the storage capacitor, respectively, and each include a potential reset period RST of the pixel electrode 2 and a common potential inversion period RV.

The write periods RW, GW, and BW are periods during which the pixel signals Sigm corresponding to gradation values of different colors are written in the sub-frame periods (first sub-frame period RSF, second sub-frame period GSF, and third sub-frame period BSF), respectively. The hold periods RH, GH, and BH are periods during which the pixel signals Sigm written in the write periods RW, GW, and BW, respectively, of the sub-frame periods are held.

Each of the pixel signals Sigm written in the write periods RW, BW, and GW of the sub-frame periods is set to a potential between a first signal potential VsigL, which is relatively low, and a second signal potential VsigH, which is relatively high, according to the gradation value of each of the pixels Pix. The polarity of the pixel signal Sigm output by the signal output circuit 8 in each of the write periods RW, BW, and GW varies according to the common potential Vcom applied to the common electrode 6 by the common electrode drive circuit 10.

Specifically, in each of the write periods RW, BW, and GW of the sub-frame periods (first sub-frame period RSF and third sub-frame period BSF of frame period F(1), and second sub-frame period GSF of frame period F(2)) in which the first common potential VcomL is applied to the common electrode 6, the signal output circuit 8 outputs the pixel signal Sigm having a relatively high potential with respect to the first common potential VcomL to the signal line SLm. That is, in each of the write periods RW, BW, and GW of the sub-frame periods in which the first common potential VcomL is applied to the common electrode 6, the signal output circuit 8 outputs the positive-polarity pixel signal Sigm.

In each of the write periods GW, RW, and BW of the sub-frame periods (second sub-frame period GSF of frame period F(1), and first sub-frame period RSF and third sub-frame period BSF of frame period F(2)) in which the second common potential VcomH is applied to the common electrode 6, the signal output circuit 8 outputs the pixel signal Sigm having a relatively low potential with respect to the second common potential VcomH to the signal line SLm. That is, in each of the write periods GW, RW, and BW of the sub-frame periods in which the second common potential VcomH is applied to the common electrode 6, the signal output circuit 8 outputs the negative-polarity pixel signal Sigm.

The light sources of a plurality of colors (such as the first light source 11R, the second light source 11G, and the third light source 11B) included in the light source device L are each controlled to be lit up in a corresponding one of the hold periods RH, GH, and BH of the sub-frame periods (first sub-frame period RSF, second sub-frame period GSF, and third sub-frame period BSF). For example, the first light source 11R is a red light source; the second light source 11G is a green light source; and the third light source 11B is a blue light source.

The first light source 11R is lit up during the hold period RH of the first sub-frame period RSF. As a result, red scattered light corresponding to the potential of the pixel signal Sigm corresponding to the gradation value of red (R) written in the write period RW of the first sub-frame period RSF is emitted.

The second light source 11G is lit up during the hold period GH of the second sub-frame period GSF. As a result, green scattered light corresponding to the potential of the pixel signal Sigm corresponding to the gradation value of green (G) written in the write period GW of the second sub-frame period GSF is emitted.

The third light source 11B is lit up during the hold period BH of the third sub-frame period BSF. As a result, blue scattered light corresponding to the potential of the pixel signal Sigm corresponding to the gradation value of blue (B) written in the write period BW of the third sub-frame period BSF is emitted.

The potential of the pixel electrode 2 of the pixel Pix held in each of the hold periods RH, GH, and BH of the sub-frame periods (first sub-frame period RSF, second sub-frame period GSF, and third sub-frame period BSF) is reset in a corresponding one of the potential reset periods RST. Specifically, in the potential reset period RST, the signal output circuit 8 applies the same potential to all the signal lines SLm in the display region 7, and the first and the second scan circuits 9A and 9B collectively apply the drive potential to all the scan lines GLn in the display region 7, so as to collectively drive the switching elements 1 of all the pixel Pix. This operation resets the potential of the pixel electrodes 2 of all the pixels Pix in the display region 7.

After the potential of the pixel electrodes 2 of all the pixel Pix in the display region 7 is reset in the potential reset period RST, the common electrode drive circuit 10 switches the common potential Vcom applied to the common electrode 6 in the common potential inversion period RV.

Specifically, for example, in the common potential inversion period RV of the first sub-frame period RSF of the frame period F(1), the common electrode drive circuit 10 switches the common potential Vcom, which is applied to the common electrode 6, from the first common potential VcomL to the second common potential VcomH.

For example, in the common potential inversion period RV of the second sub-frame period GSF of the frame period F (1), the common electrode drive circuit 10 switches the common potential Vcom, which is applied to the common electrode 6, from the second common potential VcomH to the first common potential VcomL.

For example, in the common potential inversion period RV of the third sub-frame period BSF of the frame period F(1), the common electrode drive circuit 10 switches the common potential Vcom, which is applied to the common electrode 6, from the first common potential VcomL to the second common potential VcomH.

For example, in the common potential inversion period RV of the first sub-frame period RSF of the frame period F(2), the common electrode drive circuit 10 switches the common potential Vcom, which is applied to the common electrode 6, from the second common potential VcomH to the first common potential VcomL.

For example, in the common potential inversion period RV of the second sub-frame period GSF of the frame period F (2), the common electrode drive circuit 10 switches the common potential Vcom, which is applied to the common electrode 6, from the first common potential VcomL to the second common potential VcomH.

For example, in the common potential inversion period RV of the third sub-frame period BSF of the frame period F (2), the common electrode drive circuit 10 switches the common potential Vcom, which is applied to the common electrode 6, from the second common potential VcomH to the first common potential VcomL.

The FSC control described above periodically repeats the two frame periods F(1) and F(2) so as to control the display of consecutive frame images.

Figure 6:
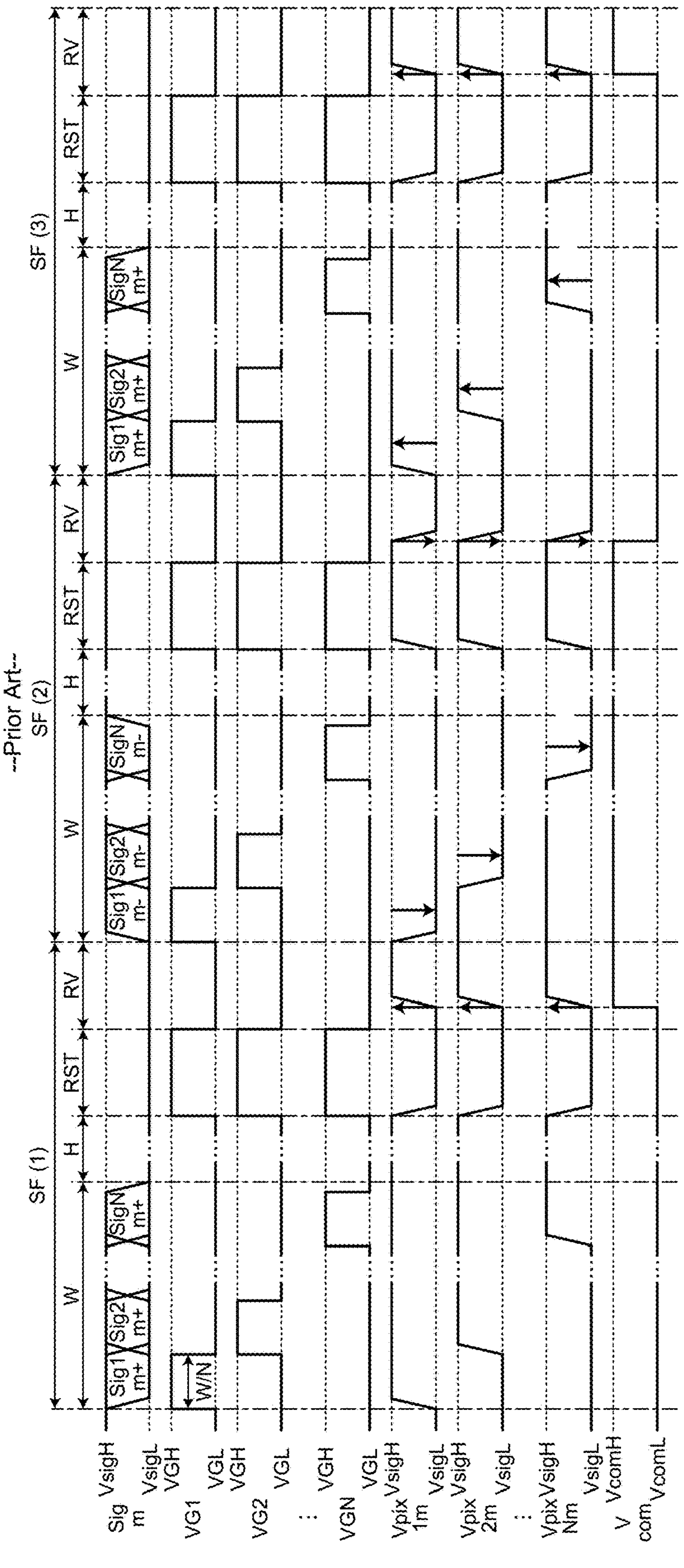
FIG. 6 is a timing diagram illustrating an example of inversion drive control of a common potential in the FSC control according to a comparative example.

FIG. 6 is a timing diagram illustrating an example of inversion drive control of the common potential in the FSC control according to a comparative example. FIG. 6 illustrates a schematic timing diagram for three consecutive sub-frame periods. Specifically, for example, the timing diagram in FIG. 5 exemplarily illustrates the sub-frame periods (first sub-frame period RSF, second sub-frame period GSF, and third sub-frame period BSF) in the frame period F(1); while the first, the second, and the third sub-frame periods RSF, GSF, and BSF are denoted as sub-frame periods SF(1), SF(2), and SF(3), respectively, in this comparative example. In addition, each of the write periods RW, GW, and BW and each of the hold periods RH, GH, and BH in the sub-frame period SF are denoted as write period W and hold period H, respectively.

In sub-frame periods SF(1) and SF(3), the common electrode drive circuit 10 supplies the first common potential VcomL to the common electrode 6. In the sub-frame period SF(2), the common electrode drive circuit 10 supplies the second common potential VcomH to the common electrode 6.

The write period W of each of the sub-frame periods SF(1), SF(2), and SF(3) includes N row write periods W/N obtained by temporally dividing the write period W by the number N of the scan lines GLn in the display region 7. The first and the second scan circuits 9A and 9B sequentially supply the drive potentials VGn (VG1, VG2, . . . , VGN) to the scan lines GLn (GL1, GL2, . . . , GLN) in each of the row write periods W/N. Each of the drive potentials VGn is, for example, a second gate potential VGH that is relatively high than a first gate potential VGL that is relatively low.

The signal output circuit 8 outputs positive-polarity pixel signals Sigm+(Sig1*m*+, Sig2*m*+, . . . , SigNm+) corresponding to the signal lines SLm (SL1, SL2, . . . , SLM−1, SLM) in each of the row write periods W/N in the write period W of each of the sub-frame periods SF(1) and SF(3). At this time, the drive potentials VGn (VG1, VG2, . . . , VGN) are respectively supplied to the scan lines GLn (GL1, GL2, . . . , GLN) to control to turn on the switching elements 1 of the respective pixels Pix, and thus, pixel electrode potentials Vpixnm (Vpix1*m*, Vpix2*m*, . . . , VpixNm) of the respective pixels Pix are set to the potentials of the positive-polarity pixel signals Sigm+(Sig1*m*+, Sig2*m*+, . . . , SigNm+). FIG. 6 illustrates an example in which the pixel electrode potentials Vpixnm (Vpix1*m*, Vpix2*m*, . . . , VpixNm) of the respective pixels Pix in the write period W of each of the sub-frame periods SF(1) and SF(3) are set to the second signal potential VsigH. In this example, the maximum gradation value is written to each of the pixels Pix in the write period W of each of the sub-frame periods SF(1) and SF(3). The potential corresponding to the minimum gradation value that can be written to each of the pixels Pix in the write period W of each of the sub-frame periods SF(1) and SF(3) is the first signal potential VsigL.

The signal output circuit 8 outputs negative-polarity pixel signals Sigm− (Sig1*m*−, Sig2*m*−, . . . , SigNm−) corresponding to the signal lines SLm (SL1, SL2, . . . , SLM−1, SLM) in each of the row write periods W/N in the write period W of the sub-frame period SF(2). At this time, the drive potentials VGn (VG1, VG2, . . . , VGN) are respectively supplied to the scan lines GLn (GL1, GL2, . . . , GLN) to control to turn on the switching elements 1 of the respective pixels Pix, and thus, the pixel electrode potentials Vpixnm (Vpix1m, Vpix2m, . . . , VpixNm) of the respective pixels Pix are set to the potentials of the negative-polarity pixel signals Sigm− (Sig1m−, Sig2m−, . . . , SigNm−). FIG. 6 illustrates an example in which the pixel electrode potentials Vpixnm (Vpix1m, Vpix2m, . . . , VpixNm) of the respective pixels Pix in the write period W of the sub-frame period SF(2) are set to the first signal potential VsigL. In this example, the maximum gradation value is written to each of the pixels Pix in the write period W of the sub-frame period SF(2). The potential corresponding to the minimum gradation value that can be written to each of the pixels Pix in the write period W of the sub-frame period SF(2) is the second signal potential VsigH.

The pixel electrode potentials Vpixnm (Vpix1m, Vpix2m, . . . , VpixNm) written to the respective pixels Pix in the row write periods W/N are maintained after the switching elements 1 are turned off. In the hold period H after the write period W, the light sources (first light sources 11R, second light sources 11G, or third light sources 11B) corresponding to the sub-frame period SF(1), SF(2), or SF(3) are turned on to display an image in accordance with the pixel electrode potentials Vpixnm (Vpix1m, Vpix2m, . . . , VpixNm) written to the respective pixels Pix.

In the comparative example illustrated in FIG. 6, the potential of each of the signal lines SLm (SL1, SL2, . . . , SLM−1, SLM) after the write period W of each of the sub-frame periods SF(1) and SF(3) is set to the first signal potential VsigL.

In the potential reset period RST of each of the sub-frame periods SF(1) and SF(3), the drive potentials VGn (VG1, VG2, . . . , VGN) are collectively supplied to all the scan lines GLn in the display region 7 to control to turn on the switching elements 1 of the respective pixels Pix. As a result, the pixel electrode potentials Vpixnm (Vpix1m, Vpix2m, . . . , VpixNm) written to the respective pixels Pix in the row write periods W/N of each of the sub-frame periods SF(1) and SF(3) change to the first signal potential VsigL. In the subsequent common potential inversion period RV, after the potential of the common electrode 6 is switched from the first common potential VcomL to the second common potential VcomH, the pixel electrode potentials Vpixnm (Vpix1m, Vpix2m, . . . , VpixNm) capacitively coupled to the common electrode 6 change to the second signal potential VsigH, as indicated by upward arrows in FIG. 6.

In the subsequent row write periods W/N of the sub-frame period SF(2), when the first signal potential VsigL (maximum gradation value) is written as the negative-polarity pixel signals Sigm− (Sig1m−, Sig2m−, . . . , SigNm−) to the respective pixels Pix, the pixel electrode potentials Vpixnm (Vpix1m, Vpix2m, . . . , VpixNm) change from the second signal potential VsigH to the first signal potential VsigL, as indicated by downward arrows in FIG. 6.

In the comparative example illustrated in FIG. 6, the potential of each of the signal lines SLm (SL1, SL2, . . . , SLM−1, SLM) after the write period W of the sub-frame period SF(2) is set to the second signal potential VsigH. In the potential reset period RST of the sub-frame period SF(2), the drive potentials VGn (VG1, VG2, . . . , VGN) are collectively supplied to all the scan lines GLn in the display region 7 to control to turn on the switching elements 1 of the respective pixels Pix.

As a result, the pixel electrode potentials Vpixnm (Vpix1m, Vpix2m, . . . , VpixNm) written to the respective pixels Pix in the row write periods W/N of the sub-frame period SF(2) change to the second signal potential VsigH. In the subsequent common potential inversion period RV, after the potential of the common electrode 6 is switched from the second common potential VcomH to the first common potential VcomL, the pixel electrode potentials Vpixnm (Vpix1m, Vpix2m, . . . , VpixNm) capacitively coupled to the common electrode 6 change to the first signal potential VsigL, as indicated by downward arrows in FIG. 6.

In the subsequent row write periods W/N of each of the sub-frame periods SF(1) and SF(3), when the second signal potential VsigH (maximum gradation value) is written as the positive-polarity pixel signals Sigm+(Sig1m+, Sig2m+, . . . , SigNm+) to the respective pixels Pix, the pixel electrode potentials Vpixnm (Vpix1m, Vpix2m, . . . , VpixNm) change from the first signal potential VsigL to the second signal potential VsigH, as indicated by upward arrows in FIG. 6.

Figure 7A:
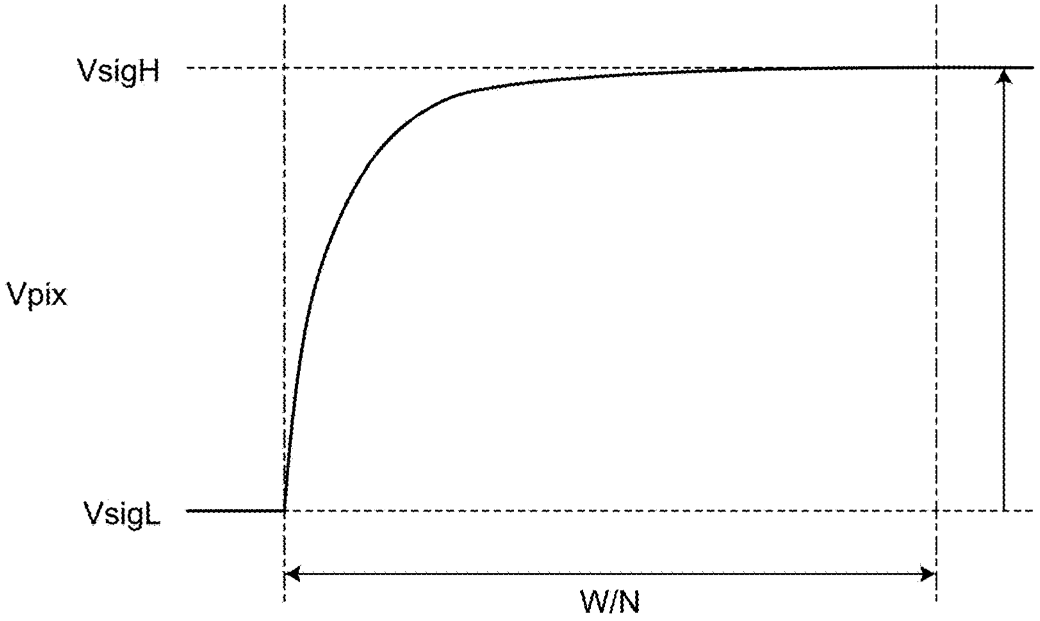
FIG. 7A is a conceptual diagram illustrating a first example of a pixel electrode potential change when the maximum gradation value is written to a pixel in the comparative example illustrated in FIG. 6.
Figure 7B:
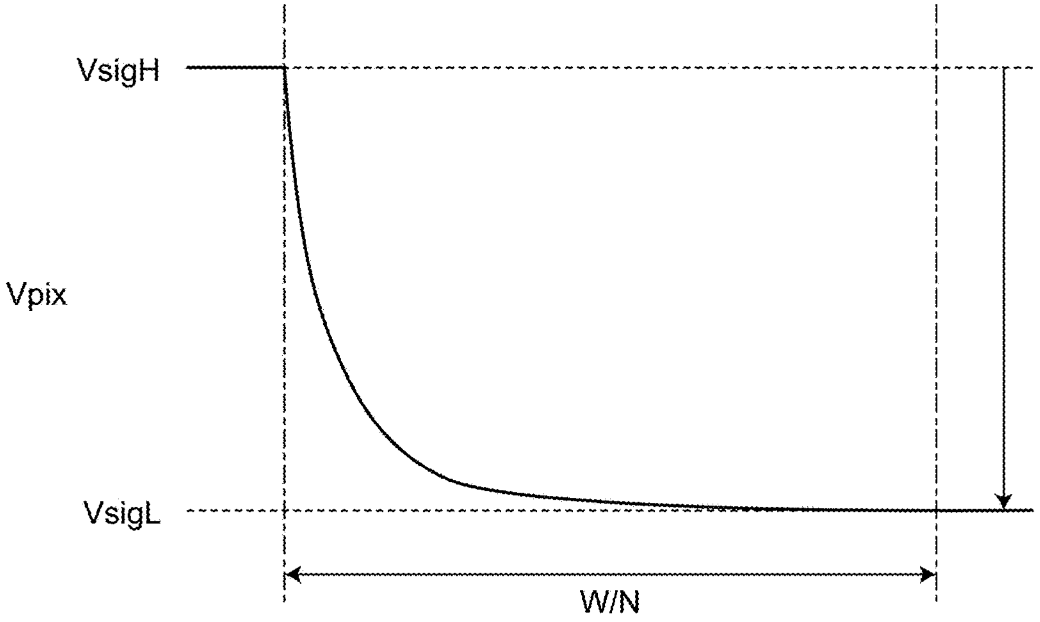
FIG. 7B is a conceptual diagram illustrating a second example of the pixel electrode potential change when the maximum gradation value is written to the pixel in the comparative example illustrated in FIG. 6.

FIG. 7A is a conceptual diagram illustrating a first example of a pixel electrode potential change when the maximum gradation value is written to the pixel in the comparative example illustrated in FIG. 6. FIG. 7B is a conceptual diagram illustrating a second example of the pixel electrode potential change when the maximum gradation value is written to the pixel in the comparative example illustrated in FIG. 6. FIG. 7A illustrates an example in which the second signal potential VsigH (maximum gradation value) is written as the positive-polarity pixel signals Sigm+ (Sig1m+, Sig2m+, . . . , SigNm+) to the respective pixels Pix in the row write periods W/N of each of the sub-frame periods SF(1) and SF(3). FIG. 7B illustrates an example in which the first signal potential VsigL (maximum gradation value) is written as the negative-polarity pixel signals Sigm− (Sig1m−, Sig2m−, . . . , SigNm−) to the respective pixels Pix in the row write periods W/N of the sub-frame period SF(2).

As illustrated in FIG. 7A, in the comparative example, in the row write periods W/N of each of the sub-frame periods SF(1) and SF(3), when the second signal potential VsigH (maximum gradation value) is written as the positive-polarity pixel signals Sigm+(Sig1m+, Sig2m+, . . . , SigNm+) to the respective pixels Pix, a longer time is required until each of the pixel electrode potentials Vpixnm (Vpix1m, Vpix2m, . . . , VpixNm) changes from the first signal potential VsigL corresponding to the minimum gradation value to the second signal potential VsigH corresponding to the maximum gradation value and is stabilized. This phenomenon results in the longer row write periods W/N in each of the sub-frame periods SF(1) and SF(3), which results in the longer write period W in each of the sub-frame periods SF(1) and SF(3).

As illustrated in FIG. 7B, in the comparative example, in the row write periods W/N of the sub-frame period SF(2), when the first signal potential VsigL (maximum gradation value) is written as the negative-polarity pixel signals Sigm− (Sig1m−, Sig2m−, . . . , SigNm−) to the respective pixels Pix, a longer time is required until each of the pixel electrode potentials Vpixnm (Vpix1m, Vpix2m, . . . , VpixNm) changes from the second signal potential VsigH corresponding to the minimum gradation value to the first signal potential VsigL corresponding to the maximum gradation value and is stabilized. This phenomenon results in the longer row write periods W/N in the sub-frame period SF(2), which results in the longer write period W in the sub-frame period SF(2).

First Embodiment

Figure 8:
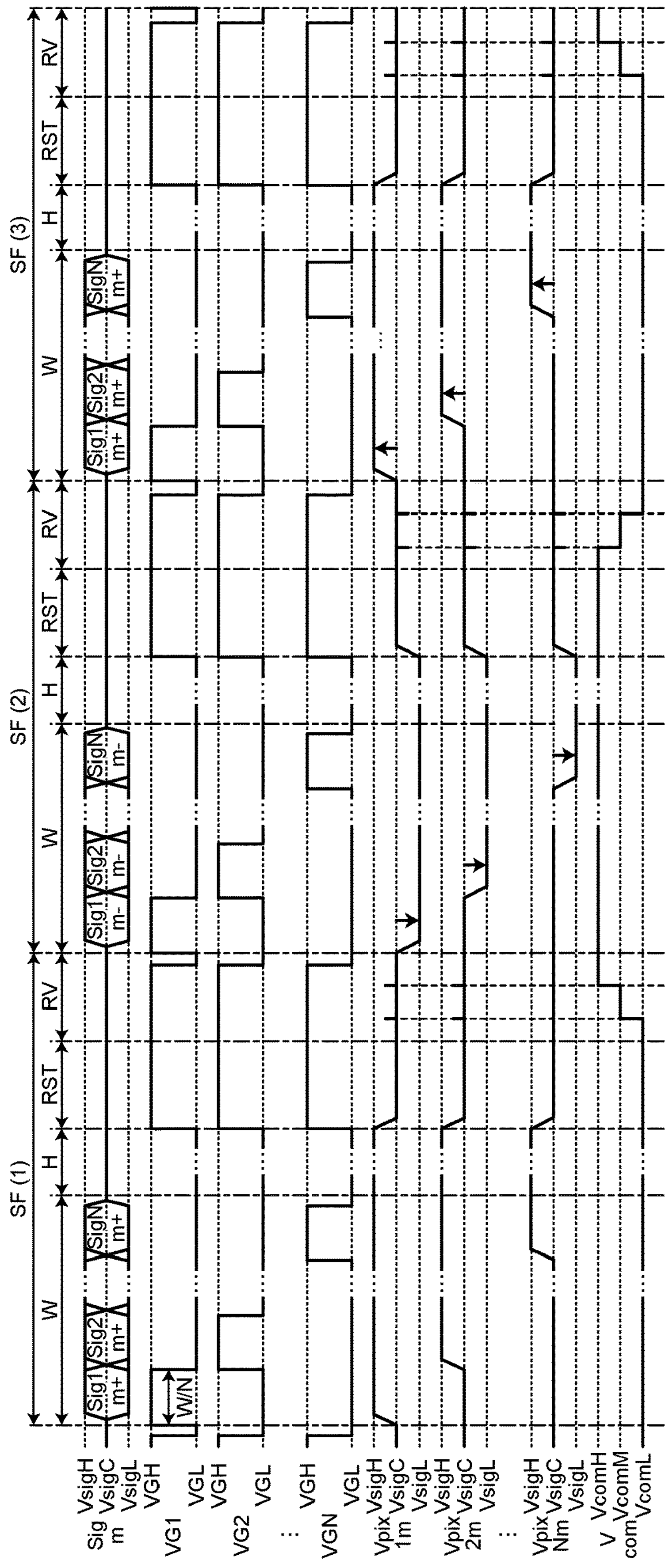
FIG. 8 is a timing diagram illustrating an example of the inversion drive control of the common potential in the FSC control according to a first embodiment.

FIG. 8 is a timing diagram illustrating an example of the inversion drive control of the common potential in the FSC control according to a first embodiment. The following describes differences from the comparative example illustrated in FIG. 6, with reference to FIG. 8.

In the first embodiment, the potential of each of the signal lines SLm (SL1, SL2, . . . , SLM−1, SLM) after the write period W of each of the sub-frame periods SF(1) and SF(3) is set to an intermediate potential VsigC between the first signal potential VsigL and the second signal potential VsigH.

In the potential reset period RST of each of the sub-frame periods SF(1) and SF(3), when the drive potentials VGn (VG1, VG2, . . . , VGN) are collectively supplied to all the scan lines GLn in the display region 7 to control to turn on the switching elements 1 of the respective pixels Pix, the pixel electrode potentials Vpixnm (Vpix1*m*, Vpix2*m*, . . . , VpixNm) written to the respective pixels Pix in the row write periods W/N of each of the sub-frame periods SF(1) and SF(3) change to the intermediate potential VsigC.

In the first embodiment, the on-state of each of the switching elements 1 of the respective pixels Pix is maintained during the common potential inversion period RV. As a result, the pixel electrode potentials Vpixnm (Vpix1*m*, Vpix2*m*, . . . , VpixNm) are maintained at the intermediate potential VsigC after the potential of the common electrode 6 is switched from the first common potential VcomL to the second common potential VcomH.

In the subsequent row write periods W/N of the sub-frame period SF(2), when the first signal potential VsigL (maximum gradation value) is written as the negative-polarity pixel signals Sigm− (Sig1*m*−, Sig2*m*−, . . . , SigNm−) to the respective pixels Pix, the pixel electrode potentials Vpixnm (Vpix1*m*, Vpix2*m*, . . . , VpixNm) change from the intermediate potential VsigC to the first signal potential VsigL, as indicated by downward arrows in FIG. 8.

In the first embodiment, the potential of each of the signal lines SLm (SL1, SL2, . . . , SLM−1, SLM) after the write period W of the sub-frame period SF(2) is set to the intermediate potential VsigC between the second signal potential VsigH and the first signal potential VsigL.

In the potential reset period RST of the sub-frame period SF(2), when the drive potentials VGn (VG1, VG2, . . . , VGN) are collectively supplied to all the scan lines GLn in the display region 7 to control to turn on the switching elements 1 of the respective pixels Pix, the pixel electrode potentials Vpixnm (Vpix1*m*, Vpix2*m*, . . . , VpixNm) written to the respective pixels Pix in the row write periods W/N of the sub-frame period SF(2) change to the intermediate potential VsigC.

In the first embodiment, the on-state of each of the switching elements 1 of the respective pixels Pix is maintained during the common potential inversion period RV. As a result, the pixel electrode potentials Vpixnm (Vpix1*m*, Vpix2*m*, . . . , VpixNm) are maintained at the intermediate potential VsigC after the potential of the common electrode 6 is switched from the second common potential VcomH to the first common potential VcomL.

In the subsequent row write periods W/N of each of the sub-frame periods SF(1) and SF(3), when the second signal potential VsigH (maximum gradation value) is written as the positive-polarity pixel signals Sigm+(Sig1*m*+, Sig2*m*+, . . . , SigNm+) to the respective pixels Pix, the pixel electrode potentials Vpixnm (Vpix1*m*, Vpix2*m*, . . . , VpixNm) change from the intermediate potential VsigC to the second signal potential VsigH, as indicated by upward arrows in FIG. 8.

Figure 9A:
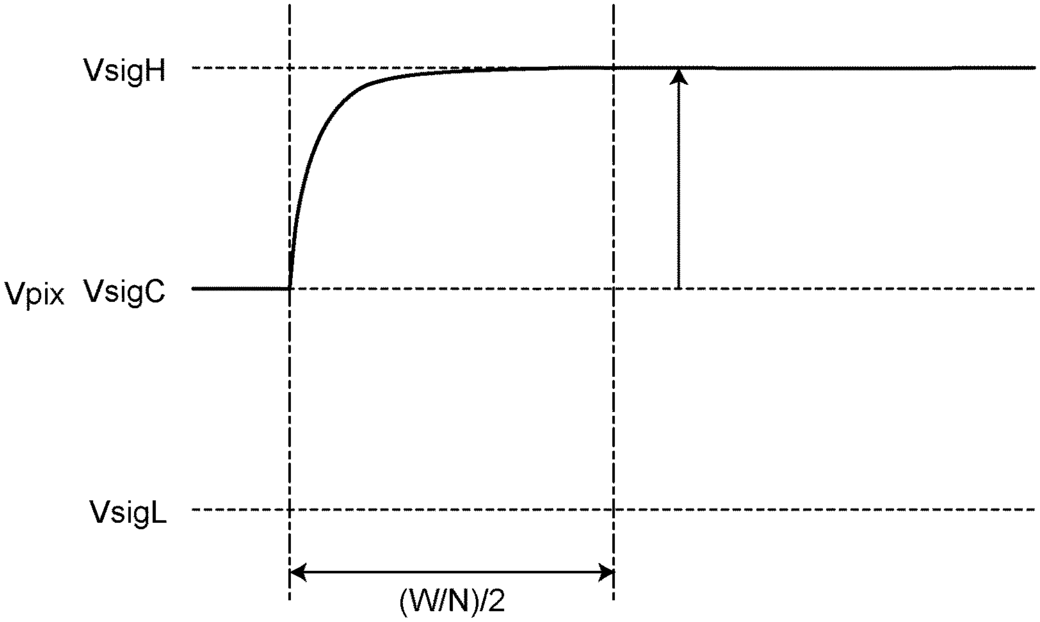
FIG. 9A is a conceptual diagram illustrating a first example of the pixel electrode potential change when the maximum gradation value is written to the pixel in the first embodiment.
Figure 9B:
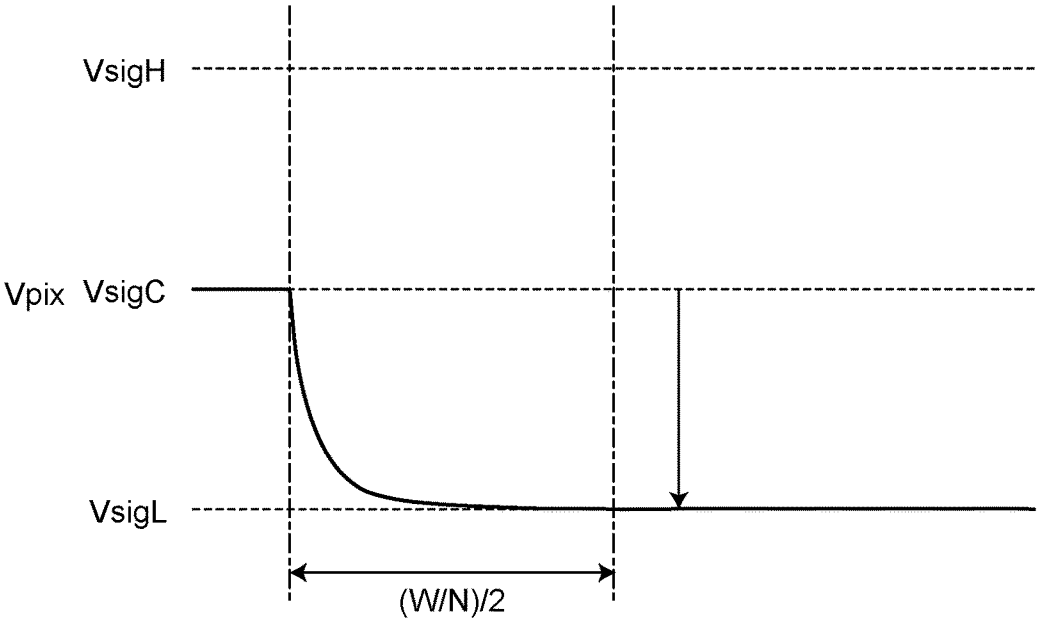
FIG. 9B is a conceptual diagram illustrating a second example of the pixel electrode potential change when the maximum gradation value is written to the pixel in the first embodiment.

FIG. 9A is a conceptual diagram illustrating a first example of the pixel electrode potential change when the maximum gradation value is written to the pixel in the first embodiment. FIG. 9B is a conceptual diagram illustrating a second example of the pixel electrode potential change when the maximum gradation value is written to the pixel in the first embodiment. FIG. 9A illustrates an example in which the second signal potential VsigH (maximum gradation value) is written as the positive-polarity pixel signals Sigm+ (Sig1*m*+, Sig2*m*+, . . . , SigNm+) to the respective pixels Pix in the row write periods W/N of each of the sub-frame periods SF(1) and SF(3). FIG. 9B illustrates an example in which the first signal potential VsigL (maximum gradation value) is written as the negative-polarity pixel signals Sigm− (Sig1*m*−, Sig2*m*−, . . . , SigNm−) to the respective pixels Pix in the row write periods W/N of the sub-frame period SF(2).

As illustrated in FIG. 9A, in the first embodiment, when the second signal potential VsigH (maximum gradation value) is written as the positive-polarity pixel signals Sigm+ (Sig1*m*+, Sig2*m*+, . . . , SigNm+) to the respective pixels Pix in the row write periods W/N of each of the sub-frame periods SF(1) and SF(3), the time until the pixel electrode potentials Vpixnm (Vpix1*m*, Vpix2*m*, . . . , VpixNm) are stabilized at the second signal potential VsigH can be made shorter than in the comparative example. Therefore, the row write period W/N in each of the sub-frame periods SF(1) and SF(3) can be reduced to (W/N)/2, which is shorter than in the comparative example, resulting in a shorter write period W of each of the sub-frame periods SF(1) and SF(3).

As illustrated in FIG. 9B, in the first embodiment, when the first signal potential VsigL (maximum gradation value) is written as the negative-polarity pixel signals Sigm− (Sig1*m*−, Sig2*m*−, . . . , SigNm−) to the respective pixels Pix in the row write periods W/N of the sub-frame period SF(2), the time until the pixel electrode potentials Vpixnm (Vpix1*m*, Vpix2*m*, . . . , VpixNm) are stabilized at the first signal potential VsigL can be made shorter than in the comparative example. Therefore, the row write period W/N in the sub-frame period SF(2) can be reduced to (W/N)/2, which is shorter than in the comparative example, resulting in a shorter write period W of the sub-frame period SF(2).

In the example illustrated in FIG. 8, when the potential of the common electrode 6 is switched from the first common potential VcomL to the second common potential VcomH in the common potential inversion period RV of each of the sub-frame periods SF(1) and SF(3), the potential is switched to an intermediate potential VcomM between the first common potential VcomL and the second common potential VcomH, and then switched to the second common potential VcomH.

In the example illustrated in FIG. 8, when the potential of the common electrode 6 is switched from the second common potential VcomH to the first common potential VcomL in the common potential inversion period RV of the sub-frame periods SF(2), the potential is switched to the intermediate potential VcomM between the second common potential VcomH and the first common potential VcomL, and then switched to the first common potential VcomL.

These operations can reduce transient potential variations of the pixel electrode potentials Vpixnm (Vpix1*m*, Vpix2*m*, . . . , VpixNm) when the potential of the common electrode 6 changes in the common potential inversion period RV.

Second Embodiment

Figure 10:
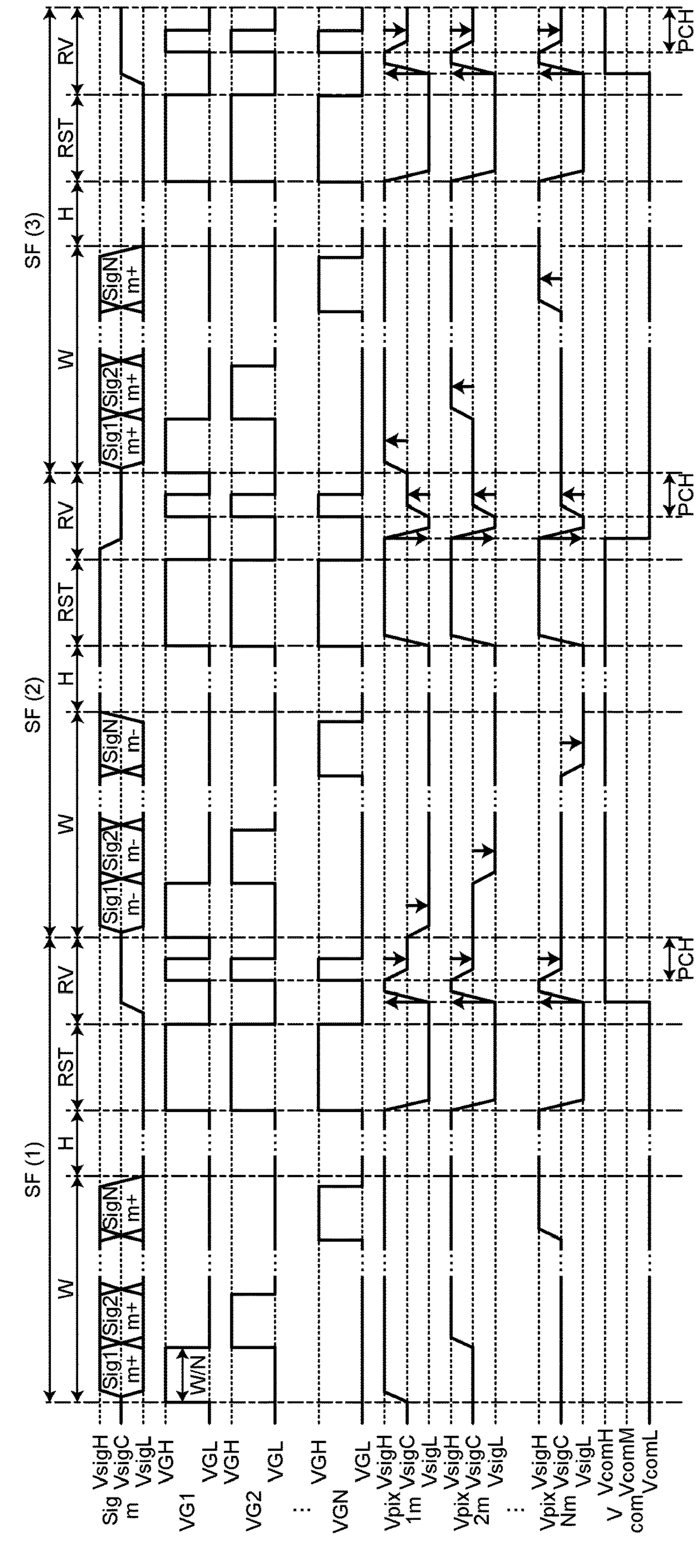
FIG. 10 is a timing diagram illustrating an example of the inversion drive control of the common potential in the FSC control according to a second embodiment.

FIG. 10 is a timing diagram illustrating an example of the inversion drive control of the common potential in the FSC control according to a second embodiment. The following describes differences from the comparative example illustrated in FIG. 6, with reference to FIG. 10.

In the second embodiment, a precharge period PCH is provided in which, after the potential of the common electrode 6 is switched from the first common potential VcomL to the second common potential VcomH, the drive potentials VGn (VG1, VG2, . . . , VGN) are collectively supplied to all the scan lines GLn in the display region 7 to control to turn on the switching elements 1 of the respective pixels Pix.

In the second embodiment, the potential of each of the signal lines SLm (SL1, SL2, . . . , SLM−1, SLM) after the write period W of each of the sub-frame periods SF(1) and SF(3) is set to the first signal potential VsigL, in the same manner as in the comparative example, and set to the intermediate potential VsigC between the first signal potential VsigL and the second signal potential VsigH in the common potential inversion period RV of each of the sub-frame periods SF(1) and SF(3).

In the potential reset period RST of each of the sub-frame periods SF(1) and SF(3), when the drive potentials VGn (VG1, VG2, . . . , VGN) are collectively supplied to all the scan lines GLn in the display region 7 to control to turn on the switching elements 1 of the respective pixels Pix, the pixel electrode potentials Vpixnm (Vpix1*m*, Vpix2*m*, . . . , VpixNm) written to the respective pixels Pix in the row write periods W/N of each of the sub-frame periods SF(1) and SF(3) change to the first signal potential VsigL.

In the subsequent common potential inversion period RV, after the potential of the common electrode 6 is switched from the first common potential VcomL to the second common potential VcomH, the pixel electrode potentials Vpixnm (Vpix1*m*, Vpix2*m*, . . . , VpixNm) capacitively coupled to the common electrode 6 change to the second signal potential VsigH, in the same manner as in the comparative example.

In the state where the potential of each of the signal lines SLm (SL1, SL2, . . . , SLM−1, SLM) is set to the intermediate potential VsigC, the drive potentials VGn (VG1, VG2, . . . , VGN) are collectively supplied to all the scan lines GLn in the display region 7 to control to turn on the switching elements 1 of the respective pixels Pix, in the precharge period PCH. Thereby, the pixel electrode potentials Vpixnm (Vpix1*m*, Vpix2*m*, . . . , VpixNm) are changed from the second signal potential VsigH to the intermediate potential VsigC.

In the subsequent row write periods W/N of the sub-frame period SF(2), when the first signal potential VsigL (maximum gradation value) is written as the negative-polarity pixel signals Sigm− (Sig1*m*−, Sig2*m*−, . . . , SigNm−) to the respective pixels Pix, the pixel electrode potentials Vpixnm (Vpix1*m*, Vpix2*m*, . . . , VpixNm) change from the intermediate potential VsigC to the first signal potential VsigL, as indicated by downward arrows in FIG. 10.

In the second embodiment, the potential of each of the signal lines SLm (SL1, SL2, . . . , SLM−1, SLM) after the write period W of the sub-frame period SF(2) is set to the second signal potential VsigH, in the same manner as in the comparative example, and set to the intermediate potential VsigC between the second signal potential VsigH and the first signal potential VsigL in the common potential inversion period RV of each of the sub-frame period SF(2).

In the potential reset period RST of the sub-frame period SF(2), when the drive potentials VGn (VG1, VG2, . . . , VGN) are collectively supplied to all the scan lines GLn in the display region 7 to control to turn on the switching elements 1 of the respective pixels Pix, the pixel electrode potentials Vpixnm (Vpix1*m*, Vpix2*m*, . . . , VpixNm) written to the respective pixels Pix in the row write periods W/N of the sub-frame period SF(2) change to the second signal potential VsigH.

In the subsequent common potential inversion period RV, after the potential of the common electrode 6 is switched from the second common potential VcomH to the first common potential VcomL, the pixel electrode potentials Vpixnm (Vpix1*m*, Vpix2*m*, . . . , VpixNm) capacitively coupled to the common electrode 6 change to the first signal potential VsigL, in the same manner as in the comparative example.

In the state where the potential of each of the signal lines SLm (SL1, SL2, . . . , SLM−1, SLM) is set to the intermediate potential VsigC, the drive potentials VGn (VG1, VG2, . . . , VGN) are collectively supplied to all the scan lines GLn in the display region 7 to control to turn on the switching elements 1 of the respective pixels Pix, in the precharge period PCH. Thereby, the pixel electrode potentials Vpixnm (Vpix1*m*, Vpix2*m*, . . . , VpixNm) are changed from the first signal potential VsigL to the intermediate potential VsigC.

In the subsequent row write periods W/N of each of the sub-frame periods SF(1) and SF(3), when the second signal potential VsigH (maximum gradation value) is written as the positive-polarity pixel signals Sigm+(Sig1*m*+, Sig2*m*+, . . . , SigNm+) to the respective pixels Pix, the pixel electrode potentials Vpixnm (Vpix1*m*, Vpix2*m*, . . . , VpixNm) change from the intermediate potential VsigC to the second signal potential VsigH, as indicated by upward arrows in FIG. 10.

In also the second embodiment, in the same manner as in the first embodiment, when the second signal potential VsigH (maximum gradation value) is written as the positive-polarity pixel signals Sigm+(Sig1*m*+, Sig2*m*+, . . . , SigNm+) to the respective pixels Pix in the row write periods W/N of each of the sub-frame periods SF(1) and SF(3), the time until the pixel electrode potentials Vpixnm (Vpix1*m*, Vpix2*m*, . . . , VpixNm) are stabilized at the second signal potential VsigH can be made shorter than in the comparative example. Therefore, the row write period W/N in each of the sub-frame periods SF(1) and SF(3) can be reduced to (W/N)/2, which is shorter than in the comparative example, resulting in a shorter write period W of each of the sub-frame periods SF(1) and SF(3).

In addition, when the first signal potential VsigL (maximum gradation value) is written as the negative-polarity pixel signals Sigm− (Sig1*m*−, Sig2*m*−, . . . , SigNm−) to the respective pixels Pix in the row write periods W/N of the sub-frame period SF(2), the time until the pixel electrode potentials Vpixnm (Vpix1*m*, Vpix2*m*, . . . , VpixNm) are stabilized at the first signal potential VsigL can be made shorter than in the comparative example. Therefore, the row write period W/N in the sub-frame period SF(2) can be reduced to (W/N)/2, which is shorter than in the comparative example, resulting in a shorter write period W of the sub-frame period SF(2).

As described above, the embodiments described above can shorten the write period W in the frame period F. As a result, for example, the frame rate can be improved. The hold period H can be relatively lengthened, allowing the lighting time of each of the light sources (first, second, and third light sources 11R, 11G, and 11B) of the light emitter 31 to be lengthened. As a result, for example, the emission intensity of each of the light sources (first, second, and third light sources 11R, 11G, and 11B) of the light emitter 31 can be reduced. Alternatively, the number of the light sources can be reduced, thereby being capable of contributing to power saving and/or cost reduction. Furthermore, since the number of time divisions of the write period W can be increased, the number of pixels on the display panel P can be increased to achieve a higher definition.

While the preferred embodiments of the present disclosure have been described above, the present disclosure is not limited to the embodiments described above. The content disclosed in the embodiments is merely an example, and can be variously modified within the scope not departing from the gist of the present disclosure. For example, any modifications appropriately made within the scope not departing from the gist of the present disclosure also naturally belong to the technical scope of the present disclosure.

What is claimed is:

1. A display device comprising:

a plurality of scan lines that extend in a first direction;

a plurality of signal lines that extend in a direction intersecting the first direction;

a scan circuit coupled to the scan lines;

a signal output circuit coupled to the signal lines;

a plurality of pixels, in each of which a gate of a switching element is coupled to a corresponding scan line of the scan lines, a pixel electrode is coupled to one of a source and a drain of the switching element, and a corresponding signal line of the signal lines is coupled to the other of the source and the drain of the switching element;

a common electrode shared among the pixels; and a common electrode drive circuit configured to supply a common potential to the common electrode, wherein in a potential reset period to reset a potential of the pixel electrode, and in a common potential inversion period subsequent to the potential reset period, the scan circuit is configured to supply, to the scan lines, a drive potential to drive the switching elements, and the signal output circuit is configured to supply, to the signal lines, an intermediate potential between a potential corresponding to a maximum gradation value of each pixel and a potential corresponding to a minimum gradation value of each pixel, and in the common potential inversion period, the common electrode drive circuit is configured to switch the common potential between a first common potential and a second common potential higher than the first common potential.

2. The display device according to claim 1, wherein, the common electrode drive circuit is configured to supply, to the common electrode, an intermediate potential between the first common potential and the second common potential in the common potential inversion period.

3. A display device comprising:

a plurality of scan lines that extend in a first direction;

a plurality of signal lines that extend in a direction intersecting the first direction;

a scan circuit coupled to the scan lines;

a signal output circuit coupled to the signal lines;

a plurality of pixels, in each of which a gate of a switching element is coupled to a corresponding scan line of the scan lines, a pixel electrode is coupled to one of a source and a drain of the switching element, and a corresponding signal line of the signal lines is coupled to the other of the source and the drain of the switching element;

a common electrode shared among the pixels; and a common electrode drive circuit configured to supply a common potential to the common electrode, wherein in a potential reset period to reset a potential of the pixel electrode, the scan circuit is configured to supply, to the scan lines, a drive potential to drive the switching elements, in a common potential inversion period subsequent to the potential reset period, the common electrode drive circuit is configured to switch the common potential between a first common potential and a second common potential higher than the first common potential, and in a precharge period after the common potential is switched, the signal output circuit is configured to supply, to the signal lines, an intermediate potential between a potential corresponding to a maximum gradation value of each pixel and a potential corresponding to a minimum gradation value of each pixel, and the scan circuit is configured to supply the drive potential to the scan lines.

* * * * *